United States Patent
Tsao

(10) Patent No.: US 10,095,642 B2
(45) Date of Patent: Oct. 9, 2018

(54) DATA ACCESSING SYSTEM AND METHOD FOR THE SAME

(71) Applicant: ACCELSTOR, INC., New Taipei (TW)

(72) Inventor: Shih-Chiang Tsao, New Taipei (TW)

(73) Assignee: Accelstor Ltd., Grand Cayman (KY)

( * ) Notice: Subject to any disclaimer, the term of this patent is extended or adjusted under 35 U.S.C. 154(b) by 147 days.

(21) Appl. No.: 15/078,053

(22) Filed: Mar. 23, 2016

(65) Prior Publication Data

US 2017/0212854 A1   Jul. 27, 2017

(30) Foreign Application Priority Data

Jan. 21, 2016  (TW) .............................. 105101838 A

(51) Int. Cl.
*G06F 13/28* (2006.01)
*G06F 15/173* (2006.01)
*H04L 29/08* (2006.01)

(52) U.S. Cl.
CPC ........ *G06F 13/28* (2013.01); *G06F 15/17331* (2013.01); *H04L 69/326* (2013.01)

(58) Field of Classification Search
CPC . H04L 12/4633; H04L 12/4641; H04L 45/66; H04L 45/745

USPC ........................................................ 710/308
See application file for complete search history.

(56) References Cited

U.S. PATENT DOCUMENTS

| | | | | |
|---|---|---|---|---|
| 6,271,752 B1* | 8/2001 | Vaios | ............... | G08B 13/19608 340/525 |
| 6,771,646 B1* | 8/2004 | Sarkissian | ............. | G06F 12/123 370/252 |
| 2006/0230218 A1* | 10/2006 | Warren | .................. | G06F 3/0607 710/315 |
| 2008/0205445 A1* | 8/2008 | Kumar | .................... | H04L 69/16 370/469 |
| 2009/0204722 A1* | 8/2009 | Ehlers | ................. | H04L 12/4633 709/236 |

* cited by examiner

*Primary Examiner* — Titus Wong
(74) *Attorney, Agent, or Firm* — Rosenberg, Klein & Lee

(57) ABSTRACT

The invention provides a data accessing system and a method for the same. The data accessing system comprises a data access unit and a data storage unit. When the data access unit is configured to access a plurality of data with continuous or discrete addresses, it issues a plurality of request instructions. The request instructions are encapsulated into a special instruction by an encapsulation module, and transmitted to the data storage unit by a data transmission interface. The data storage unit obtains the plurality of request instructions by using a de-encapsulation module to de-encapsulate the special request instruction, and executes the plurality of request instructions to access the plurality of data, so as to enhance the efficiency of data access.

22 Claims, 12 Drawing Sheets

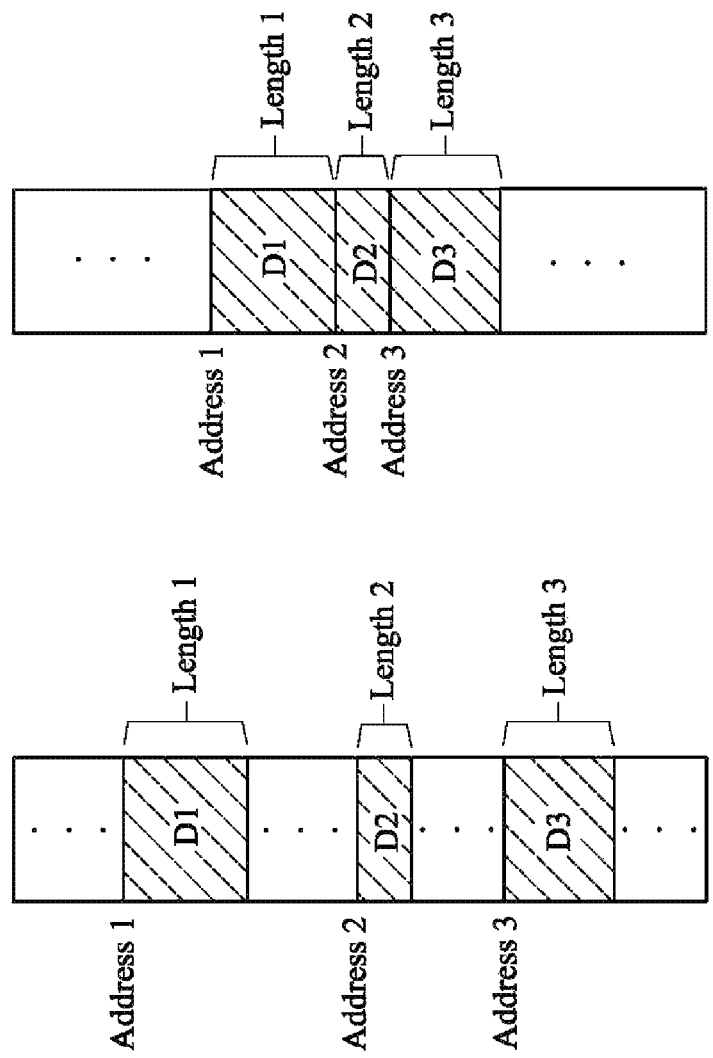

DATA ACCESSING SYSTEM AND METHOD FOR THE SAME

FIELD OF THE INVENTION

The present invention is related to a data accessing system and a method for the same, more particularly to a system and a method for accessing a plurality of datasets with continuous or discrete addresses.

BACKGROUND OF THE INVENTION

A data accessing system usually comprises a data access unit and a data storage unit. The data access unit is a processor or a peripheral. The data storage unit is a storage device, such as a hard disk drive (HDD), solid state disk (SSD), or other device for storing data.

When the data access unit is configured to access data in the data storage unit, the data access unit issues one or more request instructions to the data storage unit. The data storage unit receives and executes the one or more request instructions to access data. For example, data can be written into the data storage unit from a memory or read from the data storage unit to the memory. After accessing data, the data storage unit transmits one or more response instructions to the data access unit for replying that the data access has been completed.

If the data access unit is configured to access a plurality of datasets with continuous addresses, the plurality of request instructions can be combined into a request instruction. The data storage unit receives the request instruction and access the plurality of datasets. If the addresses of the plurality of datasets are not continuous, the request instructions can not be combined into a request instruction, the data access unit and the data storage unit can only complete the data access of the plurality of datasets one by one.

Please refer to FIG. 1. The data access unit is configured to access (read or write) the three datasets D1, D2, and D3. Since the addresses of the three datasets D1, D2, and D3 are continuous, the data access unit combines the request instructions into a request instruction and assigns the address (Address 1) of dataset D1 as the address of the request instruction. The data storage unit 15 receives the request instruction and accesses the three datasets D1, D2, and D3 with continuous addresses according to Address 1. In another case, the data access unit is configured to access the three datasets D4, D5, and D6. Since the addresses (Address 4-6) of the three datasets D4, D5, and D6 are not continuous, the request instructions can not be combined into a request instruction. The data access unit transmits the request instruction of dataset D4 to the data storage unit 15. After the data storage unit 15 completes the data access of dataset D4, it transmits a response instruction to the data access unit. The data access unit can not access dataset D5 (and dataset D6) until it receives the response instruction corresponding to the data access of dataset D4. For accessing a plurality of datasets with discrete addresses in the prior art, the data access processes are executed one by one, it is not efficient and cost a lot of time.

SUMMARY OF THE PRESENT INVENTION

It is an objective of the present invention to provide a data accessing system and a method for the same, wherein the data accessing system comprises a data access unit and a data storage unit, the data access unit encapsulates a plurality of request instructions into a special request instruction by using an encapsulation module, and the data storage unit receives and de-encapsulates the special request instruction to obtain and execute the plurality of request instructions for enhancing the efficiency of data access.

It is another objective of the present invention to provide a data accessing system and a method for the same, wherein the data storage unit executes the plurality of request instructions to access the plurality of datasets and generates a plurality of response instructions, and then encapsulates the plurality of response instructions into a special response instruction by an encapsulation module, and the data access unit receives and de-encapsulates the special response instruction to obtain the plurality of response instructions.

The present invention provides a data accessing system, comprising: a data transmission interface for transmitting commands and data; a data storage unit connected to the data transmission interface for storing datasets, wherein each dataset has an address; a data access unit connected to the data transmission interface for accessing a plurality of datasets to the data storage unit and issuing a plurality of request instructions according to the plurality of datasets; a memory connected to the data transmission interface; a first encapsulation module disposed between the data access unit and the data transmission interface for encapsulating the plurality of request instructions into a special request instruction and transmitting the special request instruction to the data storage unit through the data transmission interface; and a first de-encapsulation module disposed between the data storage unit and the data transmission interface for de-encapsulating the special request instruction into the plurality of request instructions; wherein the data storage unit obtains and executes the plurality of request instructions to access the plurality of datasets and generates a response instruction respectively after completing each request instruction.

In one embodiment of the present invention, the plurality of datasets have discrete addresses or continuous addresses.

In one embodiment of the present invention, the data storage unit executes the plurality of request instructions to write the plurality of datasets from the memory to the data storage unit or read the plurality of datasets from the data storage unit to the memory.

In one embodiment of the present invention, each request instruction comprises a command and a plurality of parameters, the plurality of parameters comprise an address, a length, and a pointer.

In one embodiment of the present invention, wherein the data transmission interface conforms to one of a serial advanced technology attachment standard, a peripheral component interconnect express standard, a serial attached small computer system interface standard, an interne small computer system interface standard, an iSCSI extensions for remote direct memory access standard, a SCSI remote direct memory access protocol standard, or other transmission interface standard.

In one embodiment of the present invention, the special request instruction conforms to a standard transport layer protocol and has a plurality of transmission columns; wherein the command and the plurality of parameters of each request instruction are filled into the plurality of transmission columns of the special request instruction according to the standard transport layer protocol.

In one embodiment of the present invention, the special request instruction further comprises a special request bit, the special request bit is filled into an unused space of one of the transmission columns.

In one embodiment of the present invention, the memory comprises a data area and a reserve area, the data area is configured to store dataset temporarily and the reserve area is configured to store the request instructions; wherein the data accessing system defines an encapsulation amount parameter and a reserve size parameter stored in the reserve area; wherein the reserve size parameter indicates a size of the reserve area, and the encapsulation amount parameter indicates an amount of the request instructions contained in a special request instruction.

In one embodiment of the present invention, the transmission columns of the special request instruction are defined by the data transmission interface, and the data transmission interface transmits the special request instruction according to a self-defined transport layer protocol.

In one embodiment of the present invention, the transmission columns of the special request instruction comprise a command column, an amount column, and a plurality of request columns.

The present invention further provides a data accessing system, comprising: a data transmission interface for transmitting commands and data; a data storage unit connected to the data transmission interface for storing datasets, wherein each dataset has an address; a data access unit connected to the data transmission interface for accessing a plurality of datasets to the data storage unit and issuing a plurality of request instructions according to the plurality of datasets; a memory connected to the data transmission interface; a first encapsulation module disposed between the data access unit and the data transmission interface for encapsulating the plurality of request instructions into a special request instruction and transmitting the special request instruction to the data storage unit through the data transmission interface;

In one embodiment of the present invention, a first de-encapsulation module disposed between the data storage unit and the data transmission interface for de-encapsulating the special request instruction into the plurality of request instructions; wherein the data storage unit obtains and executes the plurality of request instructions to access the plurality of datasets and generates a plurality of response instructions corresponding to the plurality of request instructions; a second encapsulation module disposed between the data storage unit and the data transmission interface for encapsulating the plurality of response instructions into a special response instruction and transmitting the special response instruction to the data access unit through the data transmission interface; and a second de-encapsulation module disposed between the data access unit and the data transmission interface for de-encapsulating the special response instruction into the plurality of response instructions and transmitting the plurality of response instructions to the data access unit.

In one embodiment of the present invention, the data transmission interface conforms to one of a serial advanced technology attachment standard, a peripheral component interconnect express standard, a serial attached small computer system interface standard, an internet small computer system interface standard, an iSCSI extensions for remote direct memory access standard, a SCSI remote direct memory access protocol standard, or other transmission interface standard.

In one embodiment of the present invention, the special response instruction conforms to a standard transport layer protocol and has at least one transmission column; wherein each response instruction comprises at least one report parameter, and the report parameters of the plurality of response instructions are filled into the transmission column of the special response instruction according to the standard transport layer protocol.

In one embodiment of the present invention, the special response instruction further comprises a special response bit, the special response bit is filled into an unused space of the at least one transmission column of the special response instruction.

In one embodiment of the present invention, the memory comprises a data area and a reserve area, the data area is configured to store dataset temporarily and the reserve area is configured to store the response instructions; wherein the data accessing system defines an encapsulation amount parameter and a reserve size parameter stored in the reserve area; wherein the reserve size parameter indicates a size of the reserve area, and the encapsulation amount parameter indicates an amount of the response instructions contained in a special response instruction.

In one embodiment of the present invention, the transmission columns of the special response instruction are defined by the data transmission interface, and the data transmission interface transmits the special response instruction according to a self-defined transport layer protocol.

In one embodiment of the present invention, the transmission columns of the special response instruction comprise a command column, an amount column, and a plurality of request columns.

The present invention further provides a data accessing method, adapted to a data accessing system, wherein the data accessing system comprises a data access unit and a data storage unit, comprising steps of: issuing a plurality of request instructions by the data access unit for accessing a plurality of datasets; encapsulating the plurality of request instruction into a special request instruction by using a first encapsulation module; transmitting the special request instruction by a data transmission interface to the data storage unit; de-encapsulating the special request instruction by using a first de-encapsulation module to obtain the plurality of request instructions; executing the plurality of request instructions to access the plurality of datasets by the data storage unit; and generating a response instruction after completing each request instruction by the data storage unit and transmitting the response instruction to the data access unit through the data transmission interface.

In one embodiment of the present invention, the plurality of datasets have discrete addresses or continuous addresses.

In one embodiment of the present invention, the data transmission interface transmits the special request instruction according to a standard transport layer protocol or a self-defined transport layer protocol.

The present invention further provides a data accessing method, adapted to a data accessing system, wherein the data accessing system comprises a data access unit and a data storage unit, comprising steps of: issuing a plurality of request instructions by the data access unit for accessing a plurality of datasets; encapsulating the plurality of request instruction into a special request instruction by using a first encapsulation module; transmitting the special request instruction by a data transmission interface to the data storage unit; de-encapsulating the special request instruction by using a first de-encapsulation module to obtain the plurality of request instructions; executing the plurality of request instructions to access the plurality of datasets by the data storage unit; generating a plurality of response instructions after completing the plurality of request instructions accordingly by the data storage unit; encapsulating the plurality of response instructions into a special response instruction by using a second encapsulation module; transmitting the special response instruction to the data access unit by the data transmission interface; and de-encapsulating the special response instruction by using a second de-encapsulation module to obtain the plurality of request instructions.

In one embodiment of the present invention, the plurality of datasets have discrete addresses or continuous addresses.

In one embodiment of the present invention, the data transmission interface transmits the special response instruction according to a standard transport layer protocol or a self-defined transport layer protocol.

BRIEF DESCRIPTION OF THE DRAWINGS

FIG. 5 is a schematic diagram showing a data structure of a data storage unit in accordance with one embodiment of the present invention.

FIG. 6 is a schematic diagram showing a data structure of a data storage unit in accordance with another embodiment of the present invention.

DETAILED DESCRIPTION OF THE PREFERRED EMBODIMENTS

Figure 1:
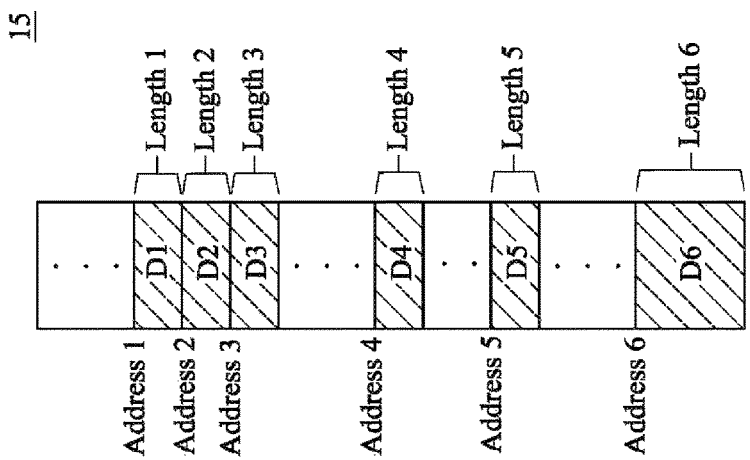
FIG. 1 is a schematic diagram showing a data structure of a data storage unit in accordance with the prior art.
Figure 2:
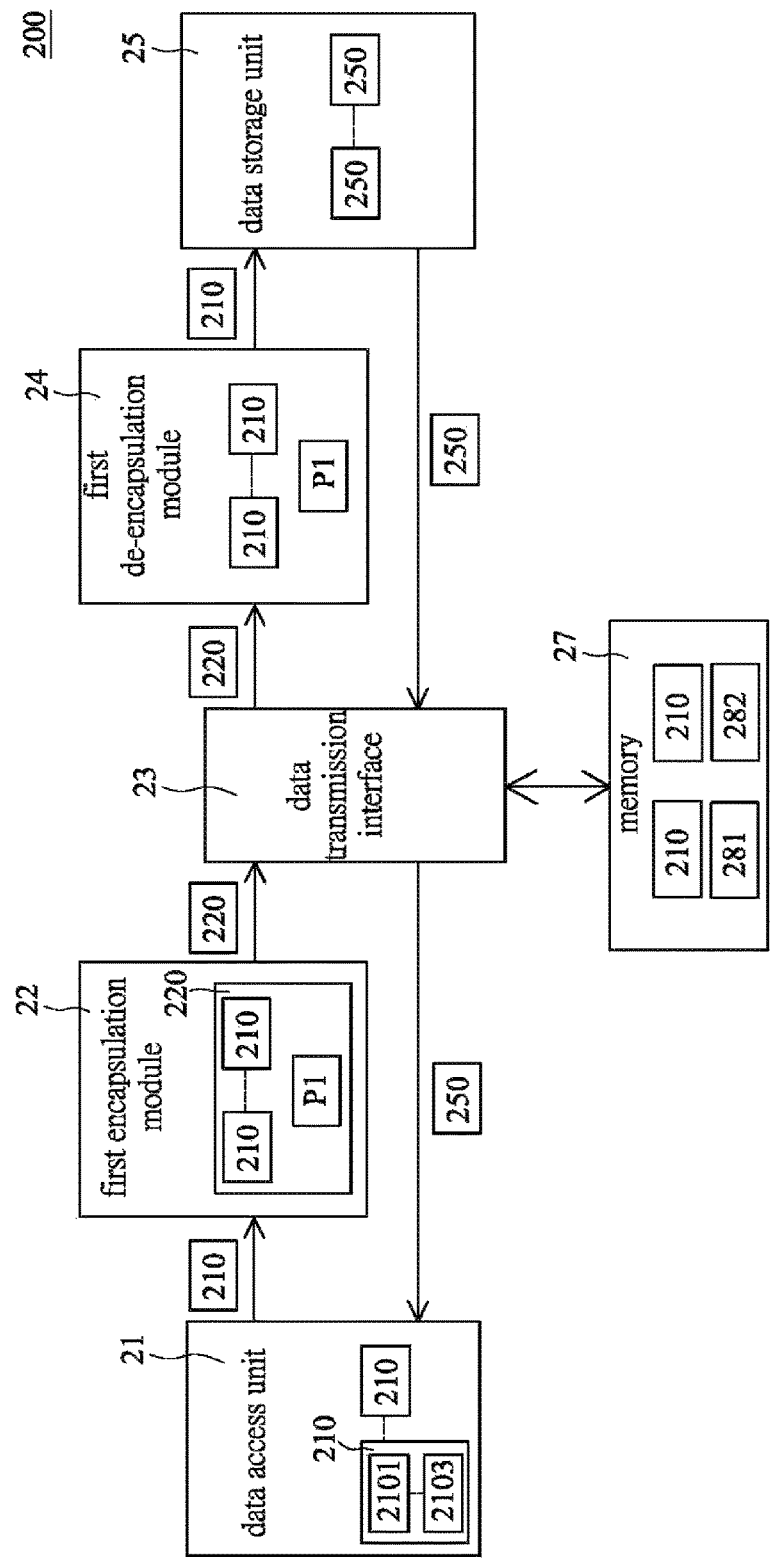
FIG. 2 is a schematic diagram of a data accessing system in accordance with one embodiment of the present invention.

Referring to FIG. 2, there is shown a data accessing system in accordance with one embodiment of the present invention. The data accessing system 200 comprises a data access unit 21, a first encapsulation module 22, a data transmission interface 23, a first de-encapsulation module 24, a data storage unit 25, and a memory 27. The data transmission interface 23 is disposed between the data access unit 21 and the data storage unit 25 for transmitting data and instructions. The data storage unit 25 is configured to store a plurality of datasets, each dataset has an address. The memory 27 is coupled to the data transmission interface 23 for storing data or instructions temporarily. The first encapsulation module 22 is disposed between the data access unit 21 and the data transmission interface 23, the first de-encapsulation module 24 is disposed between the data storage unit 25 and the data transmission interface 23. In one embodiment of the present invention, the first encapsulation module 22 is an element of the data access unit 21, the first de-encapsulation module 24 is an element of the data storage unit 25.

When the data access unit 21 is configured to access a plurality of datasets on the data storage unit 25, it issues a plurality of request instructions 210. A request instruction 210 may be a request for writing or reading a dataset. The addresses of plurality of datasets may be continuous or not continuous.

The first encapsulation module 22 encapsulates the plurality of request instructions into a special request instruction 220 and transmits the special request instruction 220 to the data storage unit 25 through the data transmission interface 23. The data storage unit 25 obtains and executes the plurality of request instructions 210, such as writing a plurality of datasets from the memory 27 to the data storage unit 25 or reading a plurality of datasets from the data storage unit 25 to the memory 27, by using the first de-encapsulation module 24 to de-encapsulate the special request instruction 220. The data storage unit 25 transmits a response instruction 250 through the data transmission interface 23 to the data access unit 21 for replying that the data access has been competed after executing each request instruction 210.

By using the first encapsulation module 22 to encapsulate the plurality of request instructions 210 from the data access unit 21 into a special request instruction 220 for transmission, the data storage unit 25 can obtain and execute the plurality of request instructions 210 by using the first de-encapsulation module 24 to de-encapsulate the special request instruction 220 for improving the efficiency of data access.

Each request instruction 210 comprises a plurality of parameters 2101-2103. For example, the parameter 2101 is the address of the dataset, the parameter 2102 is the length of the dataset, and the parameter 2103 is the pointer to the memory 27. The data storage unit 25 executes the request instruction 210 according to the parameters 2101-2103.

The transmission interface 23 conforms to one of serial advanced technology attachment (SATA) standard, peripheral component interconnect express (PCIe) standard, serial attached small computer system interface (serial attached SCSI, SAS) standard, internet small computer system interface (iSCSI) standard, iSCSI extensions for remote direct memory access (iSER) standard, SCSI remote direct memory access protocol (SRP) standard, or other transmission interface standard. In one embodiment of the present invention, data or instruction (such as special request instruction 220) conforms to a transport layer protocol standard, such as a SATA standard transport layer protocol or other standard transport layer protocol.

Figure 3:
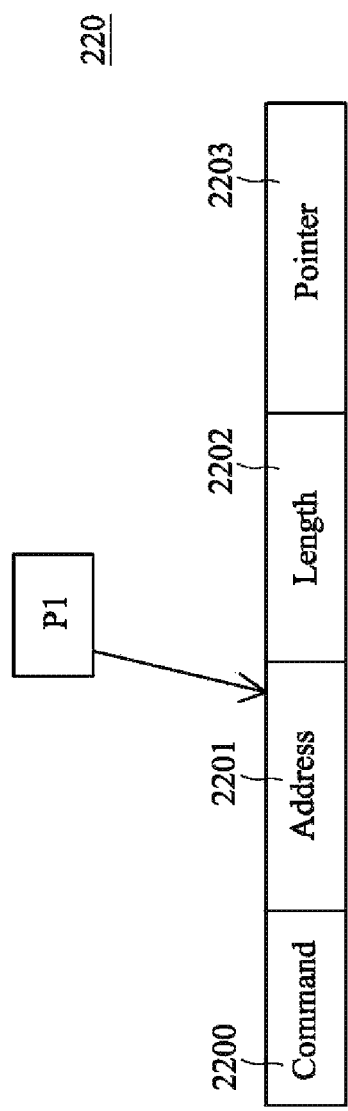
FIG. 3 is a schematic diagram showing a data structure of a special request instruction in accordance with one embodiment of the present invention.

Referring to FIG. 3, the special request instruction 220 of the present embodiment comprises a plurality of transmission columns 2200-2203 according to the standard transport layer protocol, such as a command column 2200, an address column 2202, a length column 2201, and a pointer column 2203. When the first encapsulation module 22 encapsulates the request instructions 210, the command and the parameters 2101-2103 are filled into the transmission columns 2200-2203 respectively. In one embodiment of the present invention, the special request instruction 220 comprises a special request bit P1. The special request bit P1 is filled into the unused space of one of the transmission columns 2200-2203, for example the address column 2201. The data storage unit 25 recognizes a request instruction as a special request instruction 220 according to the special request bit P1 and de-encapsulates the special request instruction 220 by using the first de-encapsulation module 24 to obtain a plurality of request instructions 210 and the command and the parameters 2101-2103.

Figure 4:
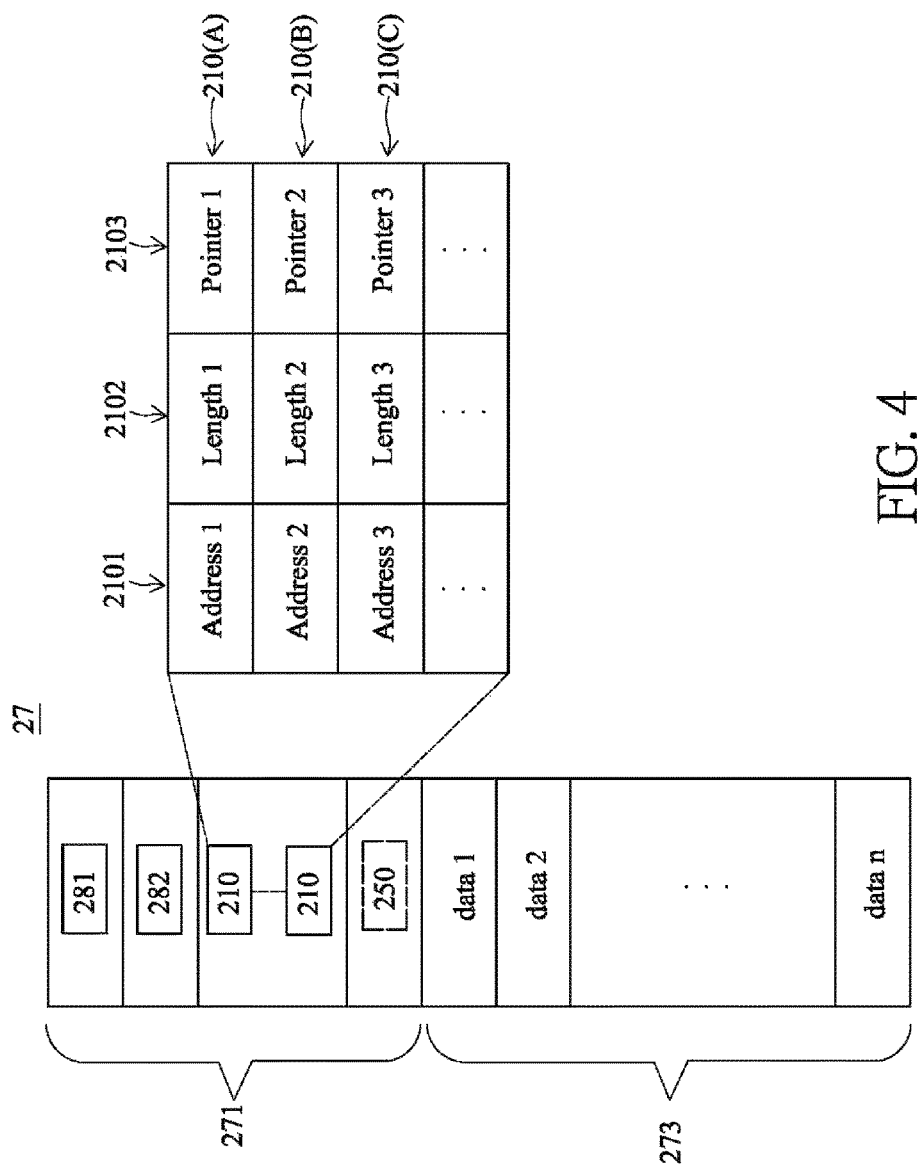
FIG. 4 is a schematic diagram showing a data structure of a memory in accordance with one embodiment of the present invention.

Referring to FIG. 4, the memory 27 of the present embodiment comprises a reserve area 271 and a data area 273. The data area 273 stores dataset temporarily. The request instructions 210 issued by the data access unit 21 are stored in the reserve area 271 temporarily. The first encapsulation module 22 catches parameters 2101-2103 of each request instruction 210 and fills the command and the parameters 2101-2103 into the transmission columns 2200-2203 to encapsulate the request instructions 210. In one embodiment of the present invention, the data accessing system 200 comprises an encapsulation amount parameter 281 and a reserve size parameter 283 stored in the reserve area 271 temporarily. The encapsulation amount parameter 281 indicates the amount of the request instructions contained in a special request instruction 220. The reserve size parameter 283 indicates the size of the reserve area 271 in the memory.

Referring to FIG. 5, when the data access unit 21 is configured to write three datasets D1, D2, and D3 with discrete addresses, it issues three request instructions, such as the first request instruction 210(A), the second request instruction 210(B), and the third request instruction 210(C). The first encapsulation module 22 fills the command (write) and the parameters 2101-2103 of the three request instructions 210(A)-(C) into the transmission columns 2200-2203 to encapsulate the three request instructions 210(A)-(C) into the special request instruction 220 according to the standard transport layer protocol. Furthermore, the special request bit P1 is also filled into the unused space of one of the transmission column 2200-2203.

After the data storage unit 25 receives the special request instruction 220 from the data transmission interface 23, the first de-encapsulation module 24 de-encapsulates the special request instruction 220 to obtain the commands and the parameters 2101-2103 of the three request instructions 210 (A)-(C). The data storage unit 25 writes the three datasets to the corresponding addresses (Addresses 1-3) in order or simultaneously according to the three request instructions 210(A)-(C) and generates three response instructions 250 correspondingly. Consequently, the data storage unit 25 of the present invention can obtain a plurality of request instructions 210 by de-encapsulating the special request instruction 220 and access a plurality of datasets simultaneously to improve the efficiency of data access for a plurality of datasets with discrete addresses.

The data accessing system 200 of the present invention can be applied on the writing or reading of a plurality of datasets with discrete addresses, as shown in FIG. 5. The data accessing system 200 of the present invention can also be applied on the writing or reading of a plurality of datasets with continuous addresses, as shown in FIG. 6.

Figure 7:
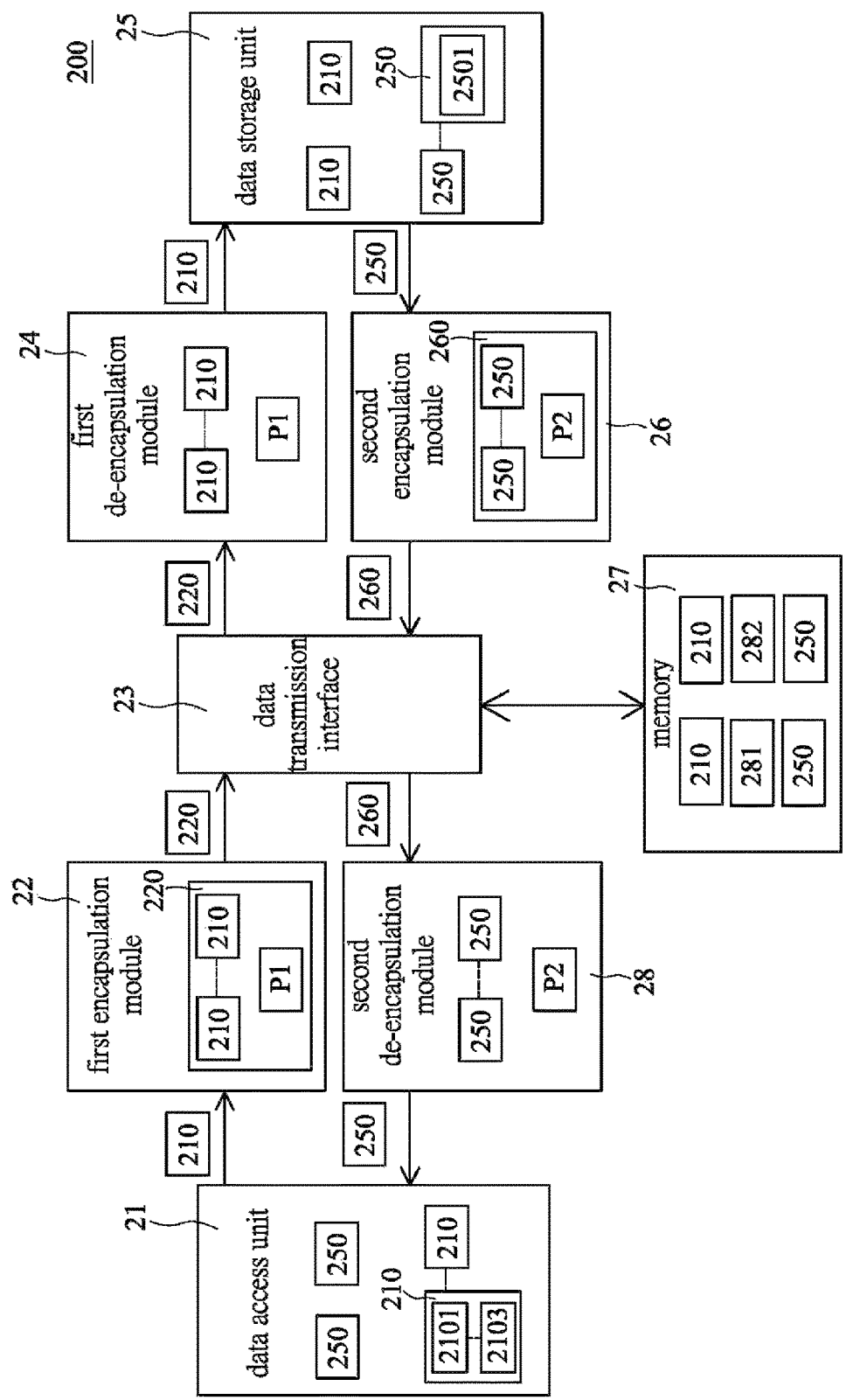
FIG. 7 is a schematic diagram showing a data accessing system in accordance with another embodiment of the present invention.

Referring to FIG. 7, there is shown a schematic diagram of a data accessing system in accordance with another embodiment of the present invention. The data accessing system 200 of the present invention can further encapsulate a plurality of response instructions 250.

In the present embodiment, the data accessing system 200 further comprises a second encapsulation module 26 and a second de-encapsulation module 28. The second encapsulation module 26 is disposed between the data storage unit 25 and the data transmission interface 23, and the second de-encapsulation module 28 is disposed between the data access unit 21 and the data transmission interface 23. In one embodiment of the present invention, the second encapsulation module 26 is an element of the data storage unit 25, and the second de-encapsulation module 28 is an element of the data access unit 21.

The data storage unit 25 generates a response instruction 250 after executing each request instruction 210. The response instruction 250 comprises at least one report parameter 2501. In the present embodiment, the response instruction 210 generated by the data storage unit 25 is stored in the reserve area 271 of the memory 27, as shown in FIG. 4. After the data storage unit 25 executes all the request instructions 210, the second encapsulation module 26 catches the response instructions 250 in the reserve area 271 of the memory 27, and encapsulates the response instructions 250 into a special response instruction 260.

In the present embodiment, the transmission columns of the special response instruction 260 also conform to the standard transport layer protocol. The second encapsulation module 26 fills the report parameters 2501 of the response instructions 250 into the transmission columns of the special response instruction 260 according to the standard transport layer protocol to encapsulate a plurality of response instructions 250 into a special response instruction 260. In one embodiment of the present invention, the second encapsulation module 26 encapsulates the amount of response instructions 250 into a special response instruction 260 according to the amount parameter 281. Furthermore, a special response bit P2 is also filled into the unused space of the transmission column of the special response instruction 260. The data access unit 21 recognizes a response instruction as a special response instruction according to the special response bit P2, and de-encapsulates the special response instruction 260 to obtain the report parameters 2501 of the plurality of response instructions 250.

Figure 8:
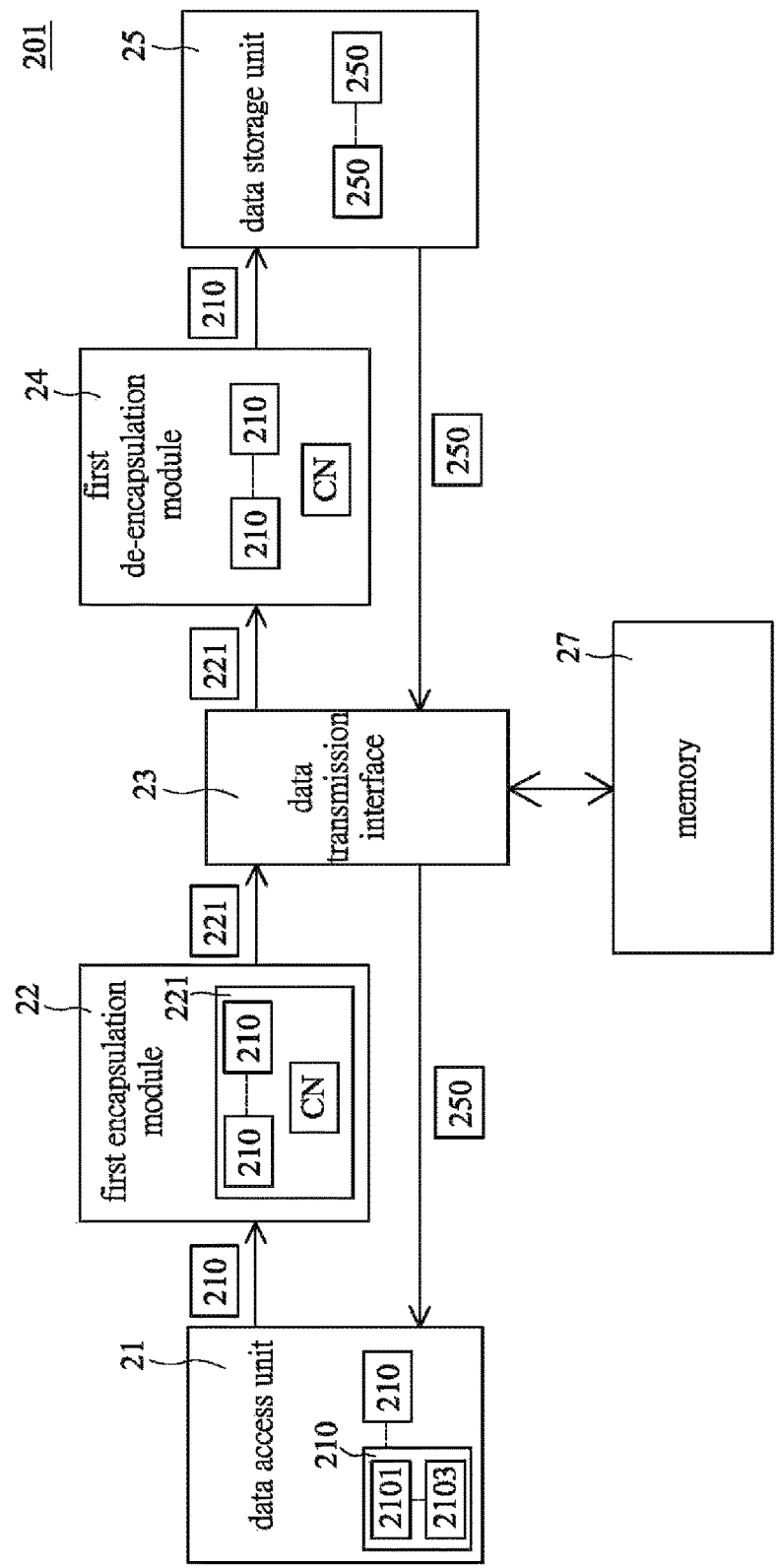
FIG. 8 is a schematic diagram showing a data accessing system in accordance with still another embodiment of the present invention.

Referring to FIG. 8, there is shown a schematic diagram of a data accessing system in accordance with still another embodiment of the present invention. For the aforementioned embodiments, the transmission columns of the special request instruction 220 conform to the standard transport layer protocol. In the data accessing system 201 of the present embodiment, the data transmission interface 23 defines the transmission columns of the special request instruction 221 according to a self-defined transport layer protocol.

Figure 9:
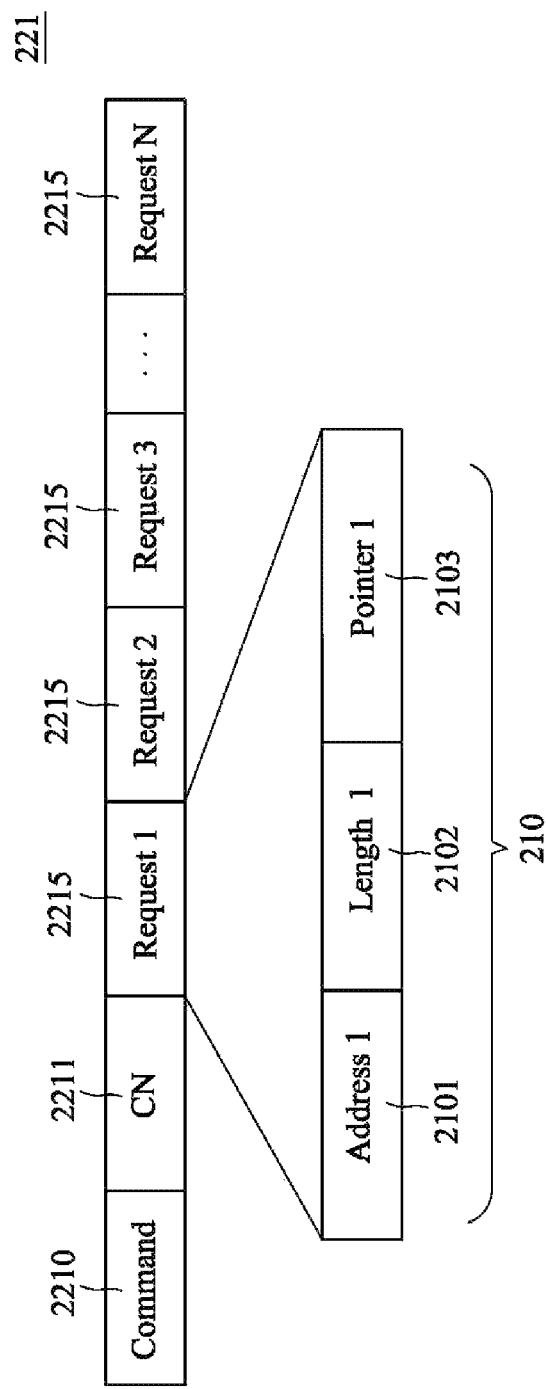
FIG. 9 is a schematic diagram showing a data structure of a special request instruction in accordance with another embodiment of the present invention.

Referring to FIG. 9, the transmission columns of the special request instruction 221 are defined by the data transmission interface 23 and comprise a command column 2210, an amount column 2211, and a plurality of request columns 2215. The command column 2210 indicates the request instruction is a write or read instruction. The amount column 2211 indicates the amount of encapsulated request instructions 210. The request column 2215 records the parameters 2101-2103 of the request instruction 210. The first encapsulation module 22 encapsulates a plurality of request instructions 210 into a special request instruction 221 with the parameters 2101-2103 of the plurality of request instructions 210 according to the self-defined transport layer protocol. The data transmission interface 23 transmits the special request instruction 221 to the data storage unit 25 according to the self-defined transport layer protocol.

The data storage unit 25 receives the special request instruction 221 from the data transmission interface 23 and de-encapsulates the special request instruction 221 by using the first de-encapsulation module 24 to obtain the command, the amount of the request instructions 210, and the parameters 2101-2103 of the request instructions 210. The data storage unit 25 executes the request instructions 210 according to the command and the parameters 2101-2103 and generates a plurality of response instructions 250 for replying that the data access is completed to the data access unit 21.

In the present embodiment, the data storage unit 25 can obtain a plurality of request instructions 210 by de-encapsulating the special request instruction 221 and access a plurality of datasets with continuous or discrete addresses simultaneously for improving the efficiency of data access.

Figure 10:
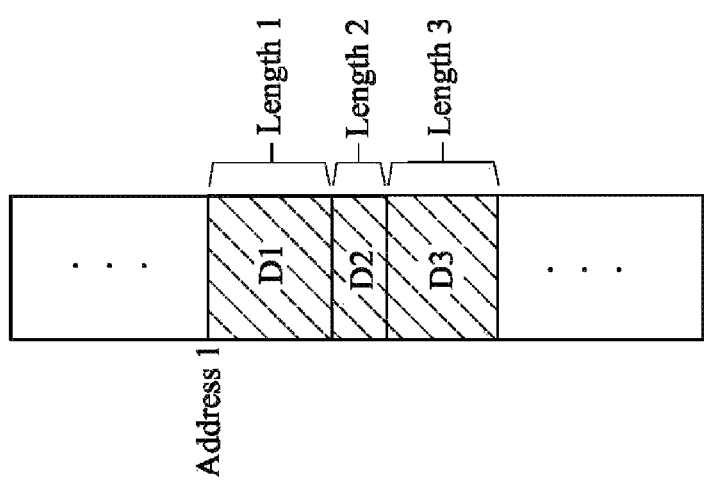
FIG. 10 is a schematic diagram showing a data structure of a data storage unit in accordance with still another embodiment of the present invention.
Figure 11:
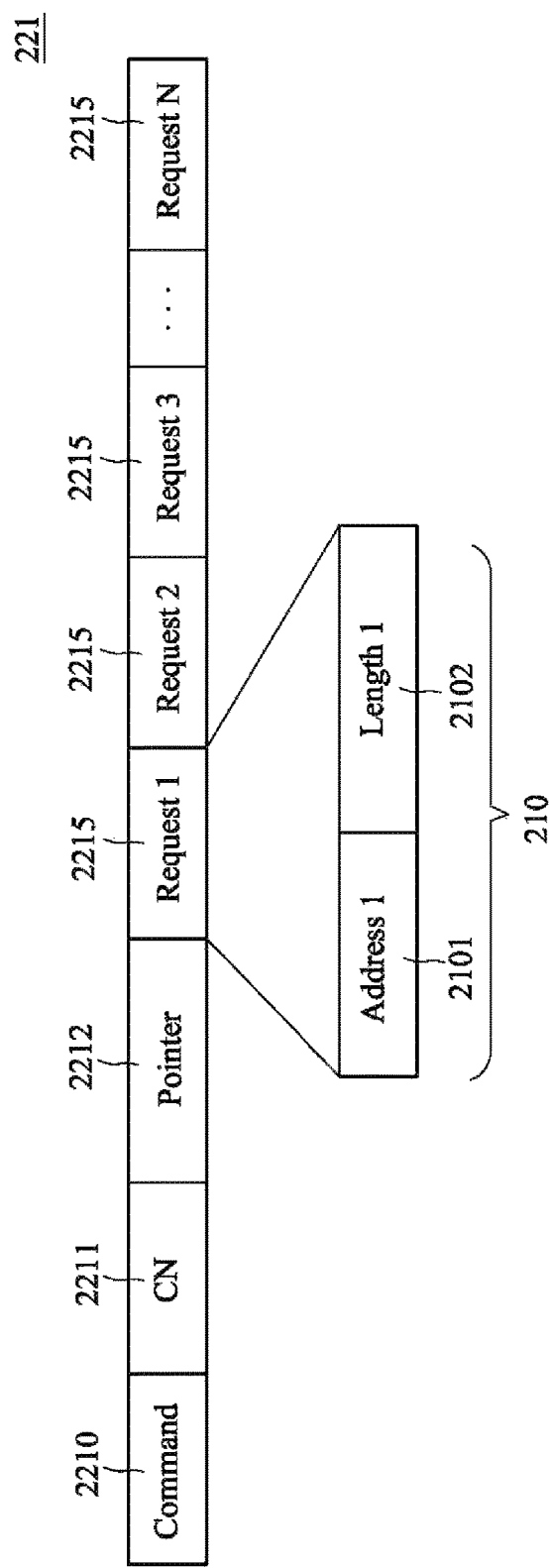
FIG. 11 is a schematic diagram showing a data structure of a special request instruction in accordance with still another embodiment of the present invention.

In one embodiment of the present invention, when the data access unit 21 is configured to write a plurality of datasets with continuous addresses to the data storage unit 25, the datasets can be combined together with the address (Address 1) of the first dataset, as shown in FIG. 10. The transmission columns defined by the data transmission interface 23 comprise a pointer column 2212. The pointer column 2212 indicates the pointer according to the first address (Address 1). Since the datasets has been combined together, the request columns 2215 record only the parameters 2101, 2102, and omit the parameters 2103. The data storage unit 25 de-encapsulates the special request instruction 221 to obtain the first address and accesses the plurality of datasets with continuous address from the first address.

Figure 12:
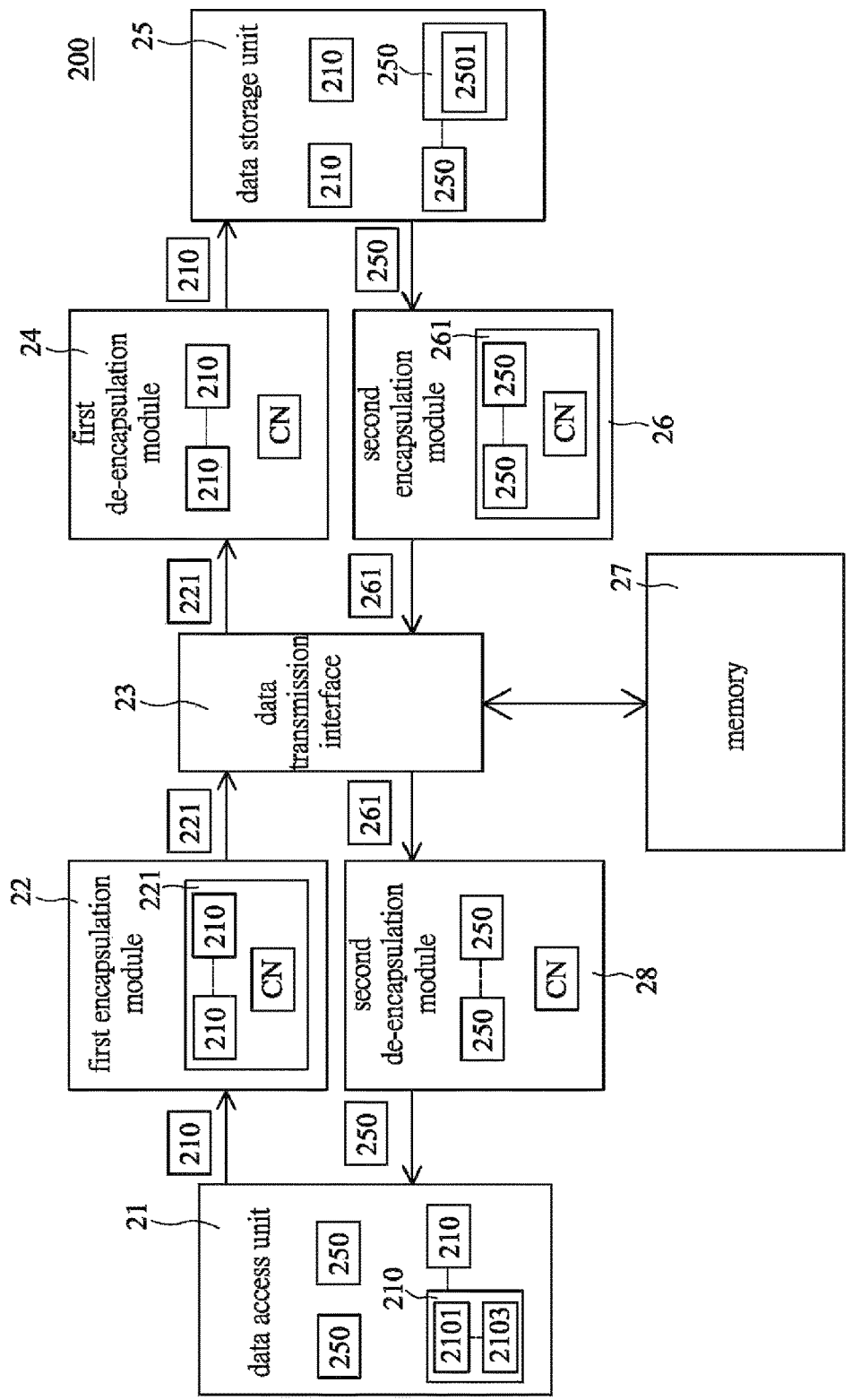
FIG. 12 is a schematic diagram showing a data accessing system in accordance with still another embodiment of the present invention.

Referring to FIG. 12, there is shown a schematic diagram of a data accessing system in accordance with still another embodiment of the present invention. In the present embodiment, a plurality of response instructions 250 can be encapsulated into a special response instruction 261. The transmission columns of the special response instruction 261 are defined by the data transmission interface 23 according to the self-defined transport layer protocol of the data transmission interface 23.

Figure 13:
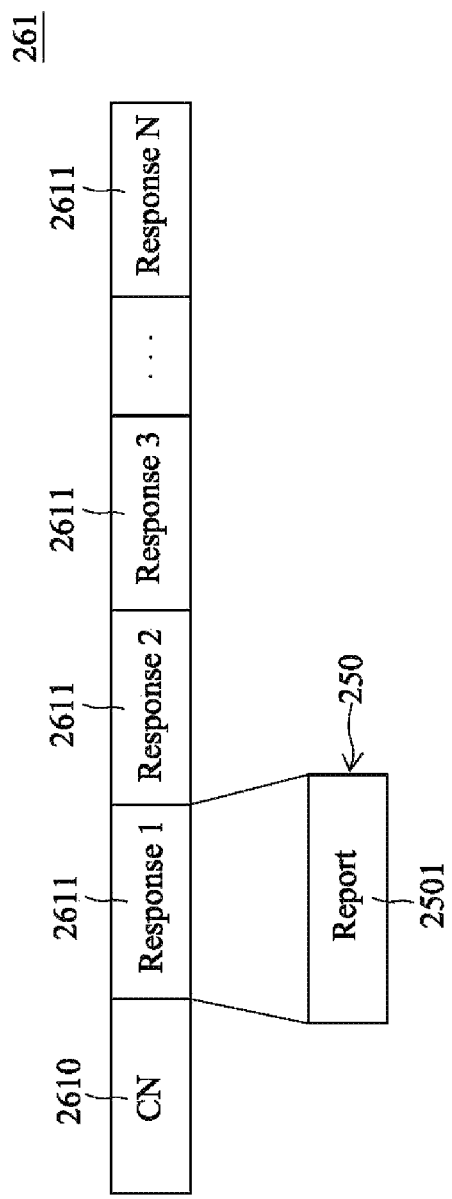
FIG. 13 is a schematic diagram showing a data structure of a special response instruction in accordance with one embodiment of the present invention.

Referring to FIG. 13, the transmission columns of the special response instruction 261 comprise an amount column (CN) 2610 and a plurality of response columns 2611. The amount column 2610 indicates the amount of encapsulated response instructions 250. The response column 2611 records the report parameter 2501 of the response instruction 250.

The data access unit 21 receives the special response instruction 261 from the data transmission interface 23 and de-encapsulates the special response instruction 261 by using the second de-encapsulation module 28 to obtain the amount (CN) and the report parameters 2501 of the response instructions 250.

In the present invention, the data access unit 21 encapsulates a plurality of request instructions 210 for accessing a plurality of datasets into a special request instruction 220/221 and transmits the special request instruction 220/221 to the data storage unit 25 according to the standard transport layer protocol or self-defined transport layer protocol. The data storage unit 25 receives the special request instruction 220/221 and de-encapsulates the special request instruction 220/221 to obtain the plurality of request instructions 210 and execute the data access processes according to the plurality of request instructions 210 in order or simultaneously for improving the efficiency of data access.

Although particular embodiments of the invention have been described in detail for purposes of illustration, various modifications and enhancements may be made without departing from the scope of the invention specified by the claims.

What is claimed is:

1. A data accessing system, comprising:
a data transmission interface for transmitting commands and data;
a data storage unit connected to the data transmission interface for storing datasets, wherein each dataset has an address;
a data access unit connected to the data transmission interface for accessing a plurality of datasets to the data storage unit and issuing a plurality of request instructions according to the plurality of datasets, wherein the request instructions are instructions for writing the dataset or reading the dataset;
a memory connected to the data transmission interface for storing data or instructions temporarily;
a first encapsulation module disposed between the data access unit and the data transmission interface for encapsulating the plurality of request instructions into a special request instruction and transmitting the special request instruction to the data storage unit through the data transmission interface; and
a first de-encapsulation module disposed between the data storage unit and the data transmission interface for de-encapsulating the special request instruction into the plurality of request instructions;
wherein the data storage unit receives the plurality of request instructions from the first de-encapsulation module, executes the plurality of request instructions to access the plurality of datasets for writing the dataset from the memory to the data storage unit or reading the dataset from the data storage unit and then writing to the memory, and generates a response instruction respectively after completing each request instruction, wherein the response instruction is transmitted to the data access unit for replying that the data access has been completed.

2. The data accessing system as claimed in claim 1, wherein the plurality of datasets have discrete addresses or continuous addresses.

3. The data accessing system as claimed in claim 1, wherein each request instruction comprises a command and a plurality of parameters, the plurality of parameters comprise an address, a length, and a pointer.

4. The data accessing system as claimed in claim 3, wherein the data transmission interface conforms to one of a serial advanced technology attachment standard, a peripheral component interconnect express standard, a serial attached small computer system interface standard, an internet small computer system interface standard, an iSCSI extensions for remote direct memory access standard, a SCSI remote direct memory access protocol standard, or other transmission interface standard.

5. The data accessing system as claimed in claim 4, wherein the special request instruction conforms to a standard transport layer protocol and has a plurality of transmission columns; wherein the command and the plurality of parameters of each request instruction are filled into the plurality of transmission columns of the special request instruction according to the standard transport layer protocol.

6. The data accessing system as claimed in claim 5, wherein the special request instruction further comprises a special request bit, the special request bit is filled into an unused space of one of the transmission columns.

7. The data accessing system as claimed in claim 1, wherein the memory comprises a data area and a reserve area, the data area is configured to store dataset temporarily and the reserve area is configured to store the request instructions; wherein the data accessing system defines an encapsulation amount parameter and a reserve size parameter stored in the reserve area; wherein the reserve size parameter indicates a size of the reserve area, and the encapsulation amount parameter indicates an amount of the request instructions contained in a special request instruction.

8. The data accessing system as claimed in claim 1, wherein a plurality of transmission columns of the special request instruction are defined by the data transmission interface, and the data transmission interface transmits the special request instruction according to a self-defined transport layer protocol.

9. The data accessing system as claimed in claim 8, wherein the transmission columns of the special request instruction comprise a command column, an amount column, and a plurality of request columns.

10. A data accessing system, comprising:
    a data transmission interface for transmitting commands and data;
    a data storage unit connected to the data transmission interface for storing datasets, wherein each dataset has an address;
    a data access unit connected to the data transmission interface for accessing a plurality of datasets to the data storage unit and issuing a plurality of request instructions according to the plurality of datasets, wherein the request instructions are instructions for writing the dataset or reading the dataset;
    a memory connected to the data transmission interface for storing data or instructions temporarily;
    a first encapsulation module disposed between the data access unit and the data transmission interface for encapsulating the plurality of request instructions into a special request instruction and transmitting the special request instruction to the data storage unit through the data transmission interface;
    a first de-encapsulation module disposed between the data storage unit and the data transmission interface for de-encapsulating the special request instruction into the plurality of request instructions; wherein the data storage unit receives the plurality of request instructions from the first de-encapsulation module, executes the plurality of request instructions to access the plurality of datasets for writing the dataset from the memory to the data storage unit or reading the dataset from the data storage unit and then writing to the memory, and generates a plurality of response instructions corresponding to the plurality of request instructions;
    a second encapsulation module disposed between the data storage unit and the data transmission interface for encapsulating the plurality of response instructions into a special response instruction and transmitting the special response instruction to the data access unit through the data transmission interface; and
    a second de-encapsulation module disposed between the data access unit and the data transmission interface for de-encapsulating the special response instruction into the plurality of response instructions and transmitting the plurality of response instructions to the data access unit for replying that the data access has been completed.

11. The data accessing system as claimed in claim 10, wherein the data transmission interface conforms to one of a serial advanced technology attachment standard, a peripheral component interconnect express standard, a serial attached small computer system interface standard, an internet small computer system interface standard, an iSCSI extensions for remote direct memory access standard, a SCSI remote direct memory access protocol standard, or other transmission interface standard.

12. The data accessing system as claimed in claim 11, wherein the special response instruction conforms to a standard transport layer protocol and has at least one transmission column; wherein each response instruction comprises at least one report parameter, and the report parameters of the plurality of response instructions are filled into the transmission column of the special response instruction according to the standard transport layer protocol.

13. The data accessing system as claimed in claim 12, wherein the special response instruction further comprises a special response bit, the special response bit is filled into an unused space of the at least one transmission column of the special response instruction.

14. The data accessing system as claimed in claim 10, wherein the memory comprises a data area and a reserve area, the data area is configured to store dataset temporarily and the reserve area is configured to store the response instructions; wherein the data accessing system defines an encapsulation amount parameter and a reserve size parameter stored in the reserve area; wherein the reserve size parameter indicates a size of the reserve area, and the encapsulation amount parameter indicates an amount of the response instructions contained in a special response instruction.

15. The data accessing system as claimed in claim 10, wherein a plurality of transmission columns of the special response instruction are defined by the data transmission interface, and the data transmission interface transmits the special response instruction according to a self-defined transport layer protocol.

16. The data accessing system as claimed in claim 15, wherein the transmission columns of the special response instruction comprise a command column, an amount column, and a plurality of request columns.

17. A data accessing method, adapted to a data accessing system, wherein the data accessing system comprises a data access unit and a data storage unit, comprising steps of:
    issuing a plurality of request instructions by the data access unit for accessing a plurality of datasets;
    encapsulating the plurality of request instructions into a special request instruction by using a first encapsulation module, wherein said request instructions are instructions for writing said dataset or reading said dataset;
    transmitting the special request instruction by a data transmission interface to the data storage unit;
    de-encapsulating the special request instruction by using a first de-encapsulation module to obtain the plurality of request instructions;
    executing the plurality of request instructions to access the plurality of datasets by the data storage unit for writing the dataset from a memory to the data storage unit or reading the dataset from the data storage unit and then writing to the memory; and
    generating a response instruction after completing each request instruction by the data storage unit and transmitting the response instruction to the data access unit through the data transmission interface for replying that the data access has been completed.

18. The data accessing method as claimed in claim 17, wherein the plurality of datasets have discrete addresses or continuous addresses.

19. The data accessing method as claimed in claim 17, wherein the data transmission interface transmits the special request instruction according to a standard transport layer protocol or a self-defined transport layer protocol.

20. A data accessing method, adapted to a data accessing system, wherein the data accessing system comprises a data access unit and a data storage unit, comprising steps of:
   issuing a plurality of request instructions by the data access unit for accessing a plurality of datasets, wherein the request instructions are instructions for writing the dataset or reading the dataset;
   encapsulating the plurality of request instruction into a special request instruction by using a first encapsulation module;
   transmitting the special request instruction by a data transmission interface to the data storage unit;
   de-encapsulating the special request instruction by using a first de-encapsulation module to obtain the plurality of request instructions;
   executing the plurality of request instructions to access the plurality of datasets by the data storage unit for writing the dataset from a memory to the data storage unit or reading the dataset from the data storage unit and then writing to the memory;
   generating a plurality of response instructions after completing the plurality of request instructions accordingly by the data storage unit;
   encapsulating the plurality of response instructions into a special response instruction by using a second encapsulation module;
   transmitting the special response instruction to the data access unit by the data transmission interface;
   de-encapsulating the special response instruction by using a second de-encapsulation module to obtain the plurality of request instructions; and
   transmitting the request instructions to the data access unit for replying that the data access has been completed.

21. The data accessing method as claimed in claim 20, wherein the plurality of datasets have discrete addresses or continuous addresses.

22. The data accessing method as claimed in claim 20, wherein the data transmission interface transmits the special response instruction according to a standard transport layer protocol or a self-defined transport layer protocol.

* * * * *